United States Patent
Appleyard et al.

(10) Patent No.: US 10,823,272 B2
(45) Date of Patent: Nov. 3, 2020

(54) GEARBOX ASSEMBLY FOR AN ELECTRIC POWER STEERING APPARATUS

(71) Applicant: TRW Limited, Solihull (GB)

(72) Inventors: Michael Appleyard, Cheltenham (GB); Mark Anthony Wilkes, Birmingham (GB)

(73) Assignee: ZF Automotive UK Limited, Solihull ( * ) Notice: Subject to any disclaimer, the term of this patent is extended or adjusted under 35 U.S.C. 154(b) by 43 days.

(21) Appl. No.: 16/337,517

(22) PCT Filed: Sep. 27, 2017

(86) PCT No.: PCT/GB2017/052892
§ 371 (c)(1),
(2) Date: Mar. 28, 2019

(87) PCT Pub. No.: WO2018/060701
PCT Pub. Date: Apr. 5, 2018

(65) Prior Publication Data
US 2019/0226571 A1 Jul. 25, 2019

(30) Foreign Application Priority Data
Sep. 28, 2016 (GB) .................................. 1616486.5

(51) Int. Cl.
*F16H 57/022* (2012.01)
*B62D 5/04* (2006.01)
(Continued)

(52) U.S. Cl.
CPC ......... *F16H 57/022* (2013.01); *B62D 5/0403* (2013.01); *B62D 5/0409* (2013.01);
(Continued)

(58) Field of Classification Search
CPC ..... B62D 5/0403; B62D 5/0409; F16C 19/16; F16C 19/36; F16C 1/16; F16C 55/24;
(Continued)

(56) References Cited

U.S. PATENT DOCUMENTS 9,205,860 B2* 12/2015 Kwon ...................... B62D 3/04
9,815,489 B2* 11/2017 Lingemann ............ B62D 3/123
(Continued)

FOREIGN PATENT DOCUMENTS

DE 102007047369 A1 4/2009
DE 102012102665 A1 10/2013
(Continued)

OTHER PUBLICATIONS

Great Britain Search Report, Application No. GB1616486.5, dated Mar. 28, 2017.
(Continued)

*Primary Examiner* — Victor L MacArthur
*Assistant Examiner* — T. Scott Fix
(74) *Attorney, Agent, or Firm* — Gigette M. Bejin

(57) ABSTRACT

A gearbox assembly for an electric power assisted steering system. The gearbox assembly includes a housing, a worm shaft, and a gear wheel, the worm shaft being supported relative to the housing by a main bearing assembly and a tail bearing assembly. The tail bearing assembly at least is free to move relative to the housing, allowing the worm shaft to move radially away from the axis of the gear wheel. The worm shaft is enables to move normal to the worm shaft axis such that it can move in and out of meshing contact with the gear wheel. The assembly further includes a gripping means that acts between the tail bearing assembly and the housing such that torque transmitted through the gear wheel generates a friction force that locks the tail bearing assembly to (Continued)

prevent movement of the worm shaft normal to the worm shaft axis that would otherwise occur.

20 Claims, 9 Drawing Sheets

(51) Int. Cl.

| | | |
|---|---|---|
| *F16H 55/24* | (2006.01) | |
| *F16C 19/16* | (2006.01) | |
| *F16C 19/36* | (2006.01) | |
| *F16H 1/16* | (2006.01) | |
| *F16H 57/039* | (2012.01) | |
| *F16H 57/12* | (2006.01) | |
| *F16H 57/02* | (2012.01) | |

(52) U.S. Cl.
CPC ............. *F16C 19/16* (2013.01); *F16C 19/36* (2013.01); *F16H 1/16* (2013.01); *F16H 55/24* (2013.01); *F16H 57/039* (2013.01); *F16H 57/12* (2013.01); *F16C 2361/61* (2013.01); *F16H 2057/0222* (2013.01); *F16H 2057/02082* (2013.01); *F16H 2057/127* (2013.01)

(58) Field of Classification Search
CPC ................... F16C 57/039; F16C 57/12; F16H 2057/02082; F16H 2057/0222; F16H 2057/127
USPC .............................. 74/400, 409, 458, 388 PS
See application file for complete search history.

(56) References Cited

U.S. PATENT DOCUMENTS

| | | | |
|---|---|---|---|
| 10,054,194 B2* | 8/2018 | Kwon | F16H 55/24 |
| 10,315,687 B2* | 6/2019 | Fuechsel | F16H 57/12 |
| 10,378,639 B2* | 8/2019 | Kim | F16H 1/16 |
| 10,578,203 B2* | 3/2020 | Schorpp | H02K 7/081 |
| 2004/0163879 A1 | 8/2004 | Segawa | |
| 2010/0139438 A1* | 6/2010 | Appleyard | B62D 1/184 |
| | | | 74/493 |
| 2010/0140011 A1* | 6/2010 | Wilkes | F16H 1/16 |
| | | | 180/444 |
| 2010/0181139 A1 | 7/2010 | Tokura et al. | |
| 2013/0126260 A1 | 5/2013 | Kim | |
| 2014/0026694 A1* | 1/2014 | Wodtke | F16H 55/286 |
| | | | 74/30 |
| 2014/0083794 A1 | 3/2014 | Ishii | |
| 2016/0208908 A1* | 7/2016 | Huck | F16H 1/16 |
| 2018/0154927 A1* | 6/2018 | Wilkes | B62D 5/04 |
| 2018/0195602 A1 | 7/2018 | Segawa | |

FOREIGN PATENT DOCUMENTS

| | | |
|---|---|---|
| EP | 0563410 A1 | 10/1993 |
| EP | 1065132 A1 | 1/2001 |
| WO | 2009138963 A1 | 11/2009 |
| WO | 2016132126 A1 | 8/2016 |
| WO | 2016181871 A1 | 11/2016 |

OTHER PUBLICATIONS

PCT International Search Report and Written Opinion, Application No. PCT/GB2017/052892, dated Dec. 6, 2017.

* cited by examiner

GEARBOX ASSEMBLY FOR AN ELECTRIC POWER STEERING APPARATUS

CROSS-REFERENCE TO RELATED APPLICATIONS

This application is a national stage of International Application No. PCT/GB2017/052892, filed 27 Sep. 2017, the disclosures of which are incorporated herein by reference in entirety, and which claimed priority to Great Britain Patent Application No. 1616486.5, filed 28 Sep. 2016, the disclosures of which are incorporated herein by reference in entirety.

BACKGROUND TO THE INVENTION

This invention relates to gearbox assemblies for electric power steering apparatus of the worm and wheel type.

Electric power steering systems use an electric motor to produce an assistance torque that is applied to a rotating part of the steering system. In a conventional arrangement this torque assists the driver in turning the wheel. Because motors work best at relatively high speeds and because compact motors produce relatively low torques, the connection between the output of the motor and the steering column is usually through a reduction gearbox.

The most widely used type of electric power assisted steering reduction gearboxes are of a relatively simple Worm and Gear configuration similar to that shown in FIG. 1 of the accompanying drawings The gearbox assembly typically comprises a gearbox housing 100 which houses a worm shaft 101 and a gear wheel 102. The worm shaft is connected to the output of an electric motor 103 (shown at the far left). The motor 103 may be secured to an end face of the housing or even located within the housing. The worm shaft 101 is supported by two bearing assemblies; one either side of the region where the worm gear of the worm shaft engages the wheel gear. The first bearing assembly in this description is called a main bearing assembly 104 and is located at an end closest to the motor 103. The second bearing assembly is referred to as a tail bearing assembly 105 and is located at an end furthest from the motor, both bearing assemblies typically comprising bearing elements supported within an inner bearing race that is threaded onto the worm shaft and an outer bearing race that is secured to the housing of the gearbox assembly. The function of the bearing assemblies is to allow the worm shaft to rotate whilst to a certain degree limiting axial and radial movement as will be explained. The gear wheel 102 is connected to an output shaft 106 of the gearbox and located so that teeth of the gear wheel engage teeth of the worm shaft.

It is known that the speed reduction gearboxes used in Electrical Power-assisted Steering (EPS) apparatus are prone to rattle due to external torsional vibrations acting at their Output Shafts. These vibrations originate at the road wheels due to surface roughness or unbalanced wheels. Alternatively, mechanical noise can arise from sudden torque reversals applied at the steering wheel by the driver which cause the teeth of the wheel gear to apply a sudden three onto the worm shaft teeth. The main rattle sites in a worm and wheel gearbox are at the engagement of the worm and gear teeth and at the main bearing, closest to the motor, which axially locates the worm shaft.

When there is a zero or low level of transmitted gearwheel torque, rattle between the gear teeth can be suppressed by biasing the wormshaft into mesh with the gearwheel by means of an external force such as the anti-rattle spring 107 so that the teeth are held in so-called "dual-flank" contact. i.e., both sides of the engaged teeth on the wormshaft are simultaneously in contact with the adjoining tooth flanks on the gear wheel. There is no rotational free play between the gearwheel and the wormshaft in this situation. The spring pushes (downwards in FIG. 1) on the outer race of the wormshaft tail bearing.

The biasing means requires a small amount of radial movement of the worm shaft and this is achieved by allowing it to pivot around its axis in the plane of the gearwheel by a small angle (typically less than +/−0.5 degrees) either side of its nominal position. This movement is controlled by the tail bearing that is allowed to move linearly by small amounts (typically less than +/−0.5 mm) and typically by the main bearing having sufficient internal axial clearance between its balls and the sides of its race grooves to permit a small articulation (i.e. tilting) angle which is typically less than +/−0.5 degrees.

When comparatively high torque is being transmitted by the gear set in one particular direction, there is a large contact load on one flank of each engaged tooth. This heavy contact is generally sufficient to ensure that the loaded tooth flanks do not separate when oscillating torque fluctuations from the road surface, etc. are superimposed. Therefore the other, non-loaded, tooth flanks will not rattle against each other even if there is a gap between them. In other words, when there are torque fluctuations present, having only "single-flank" contact does not result in rattle once the average torque being transmitted by the gearbox exceeds a certain threshold level. Obviously, the exact level depends on the magnitude of the superimposed torque fluctuations to which the unit is subjected and on the dynamics of the steering system. Conversely, it has been established that, if dual-flank contact can be maintained for transmitted torque below the said threshold level, then gear rattle will not be serious problem in general driving In the arrangement shown in FIG. 1, it is usually assumed that the inner race of the main bearing and hence the wormshaft, pivots about an axis which passes through that bearing's centre and therefore lies on the axis of the wormshaft. This is actually not the ideal location for the pivot axis because the tooth contact occurs in a different plane; i.e. it occurs nominally where the P.C.D. (Pitch Circle Diameter) of the wormshaft. touches the P.C.D. of the Gearwheel and is several millimetres below the main axis if the wormshaft. The tooth contact forces act in a direction which is perpendicular to the sloping tooth flank as shown in FIG. 2 but can be considered to have an "axial" component which is parallel to the wormshaft and a "normal" component which tries to push the wormshaft and the gearwheel apart. Note that there is also a third force component, perpendicular to the wormshaft axis and horizontal in FIG. 1, which is due to the so-called "helix" angle of the teeth. This helix angle is instrumental in determining the reduction ratio of the gearbox.

The fact that the pivot axis of the wormshaft is nominally at the centre of the main bearing, and therefore does not pass through the tooth contact plane, means that the axial component of the gear tooth force acting on the wormshaft imposes a moment about the pivot axis which is in addition to, or subtracts from, the moment generated by the normal component.

Furthermore, the pivoting moment due to the axial component reverses its direction when the torque being transmitted by the gearbox reverses whereas the pivoting moment due to the normal component does not. Therefore, for one direction of torque transmission, the overall pivoting moment acting on the wormshaft is equal to the sum of those moments separately caused by the axial and normal components of the gear tooth forces but is equal to their difference for the other direction of torque transmission. This results in some asymmetry in the behavior of the gearbox with respect to the direction of the torque it is transmitting. This asymmetry mainly reveals itself as differences in the friction losses when the same level of torque is transmitted in the two directions.

The said asymmetry can be removed by moving the pivot centre of the wormshaft from the centre of the main bearing to a position which lies in the gear tooth contact plane. This involves mounting the main bearing in some form of gimbal which has its pivot axis in the tooth contact plane. Although this is a more complicated arrangement to manufacture, it does have the advantage that the extra internal clearance in the main bearing required for creating the pivot effect is no longer needed. Therefore there is the additional benefit that, with the said gimbal mounting, rattle noises from the main bearing are less of a problem to suppress. However, careful design is needed to avoid creating a new rattle site at the gimbal pivot itself.

SUMMARY OF THE INVENTION

A feature of the present invention is to ameliorate problems that have been identified by the applicant in prior art gearbox assemblies associated with the high friction that arises when a high anti rattle spring force is used to reduce gearbox rattle.

According to a first aspect the invention provides a gearbox assembly for an electric power assisted steering apparatus comprising:

a gearbox housing which houses a worm shaft and a gear wheel, the worm shaft incorporating one or more external helical worm teeth and being supported relative to the housing by a main bearing assembly at an end closest to the motor and by a tail bearing assembly at an end furthest from the motor, and the gear wheel being supported by an output shaft having at least one end that provides a take-off from the gearbox assembly, in which at least the tail bearing assembly is free to move relative to the housing through a limited range of motion that enables the worm shaft to move radially away from the axis of the wheel gear, and the main bearing assembly acting as a pivot centre for tilting movements of the wormshaft and the tail bearing assembly further allowing linear movements of the wormshaft in a first direction substantially normal to the wormshaft axis so as to displace the worm teeth in and out of meshing engagement with the gear wheel, the teeth of the wormshaft having sloping flanks which cause the wormshaft to be urged in that first direction away from the wheel gear when the gearbox is transmitting torque and the teeth of the wormshaft having a helix angle which causes the worm teeth to be urged in a second direction generally parallel to the gear wheel axis when the gearbox is transmitting torque, and characterised in that the gearbox assembly further comprises a gripping means having a first gripping part fixed to one of the tail bearing assembly and the gearbox housing and a second gripped part that is fixed to the other of the tail bearing assembly and the gearbox housing, the gripping part applying a gripping force onto the gripped part which increases as the gearwheel torque increases such that for non-zero gearwheel torques the gripping means generates a friction force that substantially locks the tailbearing assembly to prevent the linear movements of the wormshaft in the first direction that would otherwise occur.

The applicant has appreciated that it is advantageous to provide a gripping means which can lock the tail bearing in place by generating a grip, i.e. a frictional force, that is equal to or greater that the corresponding force, the so-called kick-out force, in the first direction created by the gearwheel torque. To be fully effective, this grip should increase as the torque generated force increases so that it always exceeds the kick-out force in the first direction.

The gripping means may generate sufficient friction force to lock completely for all non-zero torque loads carried by the gearwheel, or may lock only for torques above a low torque level at which other small (and otherwise insignificant) frictional forces may come to fore. By lock we may mean totally preventing movement in the first direction that would otherwise arise due to the torque loading, or substantially preventing movement.

By providing a friction force in the first direction that exceeds the kick out force the tail bearing, and hence the wormshaft, the two are effectively locked in engagement. Because the friction force decreases as the gearwheel torque decreases, and may drop to zero or close to zero with no gearwheel torque, the anti-rattle spring remains free to push the wormshaft teeth into engagement with the wheel gear teeth at low or zero gearwheel torques, maintaining the desired contact.

The tail bearing assembly may comprise an inner race and an outer race separated by bearing elements, and may comprise a guide that locates the outer race of tailbearing assembly relative to the gearbox housing. The guide may permit the linear movement of the tail bearing outer race. The gripping means may act upon the outer race, or upon the guide where the guide is secured to the outer race.

The gripping means may comprise a gripped part that is secured to the tail bearing assembly and a gripping part that is fixed relative to the gearbox housing and that grips the gripped element. Alternatively, the gripping means may comprise a gripped element that is secured to the gearbox housing and a gripping mechanism that is fixed relative to the tail bearing assembly and that grips the gripped element.

The gearbox assembly may be arranged such that the main bearing assembly or the tail bearing assembly provide a restraint against movements of the wormshaft parallel to its own axis.

The gearbox assembly may, for example, be arranged such that any axial load on the wormshaft is reacted by the main bearing which causes the wormshaft to attempt to pivot about a point at or close to the main bearing when a gearwheel torque is applied, the tail bearing in turn being arranged so that it permits the pivoting movement of the wormshaft. Thus, the main bearing means may provide a substantially rigid restraint against movements of the wormshaft parallel to its own axis.

In such an arrangement, where the gripped part is fixed to the tail bearing assembly, the gripped part may comprise a first member, which may be cylindrical or rectangular in cross section of some other uniform cross section along its length, which is rigidly attached to the non-rotating part of the tail bearing assembly and the axis of which said first member extends from the said non-rotating part in a substantially radial direction away from the tail bearing means, this direction being substantially parallel to the plane of the pitch circle of the gear wheel, the said first member being slideably engaged with the gripping part which comprises a second member which is distal from the wormshaft axis and is rigidly attached to the gearbox housing, the said second member having a bore which is coaxial with the first member, the common axes of the first member and the said bore having a direction substantially normal to the wormshaft axis and there being a definite length of engagement between the first member and the said bore.

The gripping means, when the gripped part is fixed to the gearbox housing, may in an alternative comprise a first member (again this could be cylindrical or rectangular in cross section or of some other cross section) which is distal from the wormshaft axis and which is rigidly attached at one end to the gearbox housing and which extends in a substantially radial direction towards the centre of the second bearing means and which is substantially parallel to the plane of the pitch circle of the gear wheel, the said first member being slideably engaged with a second member which is rigidly attached to the non-rotating part of the second bearing means the second member having a bore which extends in a substantially radial direction away from the second bearing means and which is coaxial with the first member, the common axes of the first member and the said bore having a direction substantially normal to the wormshaft axis and there being a definite length of engagement between the first member and the said bore.

The second bearing means may be of the needle roller type having a cylindrical outer race and a set of parallel rollers held circumferentially spaced by a cage and having an the inner race which has a spherical portion at its centre which allows for some angular misalignment between the inner race and the outer race.

In an alternative arrangement, the gripping means may comprise a gripped part that comprises a first member which is rigidly attached to the non-rotating part of the second bearing means and the axis of which said first member extends from the said non-rotating part in a substantially radial direction away from the second bearing means this direction being at an angle to the plane of the pitch circle of the gear wheel, the said first member being slideably engaged with a second member which is distal from the wormshaft axis and is rigidly attached to the gearbox housing the said second member having a bore which is coaxial with the first member, the common axes of the first member and the said bore having a direction substantially normal to the wormshaft axis and there being a definite length of engagement between the first member and the said bore.

In another arrangement, the said guiding means may comprise a gripped part that comprises a first member which is distal from the wormshaft axis and which is rigidly attached at one end to the gearbox housing and which extends in a substantially radial direction towards the centre of the second bearing means and which is at an angle to the plane of the pitch circle of the gear wheel, the said first member being slideably engaged with a second member which is rigidly attached to the non-rotating part of the second bearing means the second member having a bore which extends in a substantially radial direction away from the second bearing means and which is coaxial with the first member, the common axes of the first member and the said bore having a direction substantially normal to the wormshaft axis and there being a definite length of engagement between the first member and the said bore.

The grip part may comprise a generally elongate member that could be a shape other than cylindrical and may fit in a correspondingly shaped non-cylindrical bore. It may have a uniform cross section along its length, as may the bore.

In each of the above arrangements, the distance from the wormshaft axis of the said bore in the second member, the said length of engagement of the first member in the said bore and the coefficient of sliding friction between the first member and the said bore may combine to prevent sliding motion from occurring, one relative to the other, when the second bearing means reacts the forces generated at the worm teeth during torque transmission by the gearbox.

Where the first member is general rectangular in cross section—by which we mean and shape having two opposed and parallel planar, the said bore of rectangular cross-section may be formed by a stack of laminations each of which has a substantially rectangular aperture which defines part of the said bore.

In one arrangement of a laminated bore, one side of the said aperture in a first lamination of an adjacent pair partially defines a first side of the said bore and one side of an aperture in a second lamination of the said pair partially defines a second side of the bore the second side of the bore being generally opposite to the first side of the bore there being multiple such said pairs of laminations stacked so as define an elongate bore of rectangular cross-section.

The end of each lamination which is closest to the side of its aperture which partially defines the bore formed by the stack may protrude beyond the adjacent end of its neighbouring lamination or laminations when assembled as a stack.

In a convenient arrangement, all the laminations in the stack are asymmetric and substantially the same as each other in shape and are alternately stacked in opposite orientations.

Any number of laminations greater than 2 may be provided and it is preferable that the total number of laminations is an odd number.

To secure the laminations in position the said stack of laminations may be clamped between two relatively rigid plates. These plates may be made of a material with a similar coefficient of thermal expansion as the material of the laminations.

In an alternative to the provision of an elongate member such as a pin that jacks within a bore to grip at two opposing points, the gripping means may comprise a grip part comprising a body having a first pair of parallel sides which is rigidly attached to a non-rotating part of the tail bearing assembly and where the plane of symmetry of the said first pair of parallel sides is parallel to the nominal wormshaft axis and is substantially parallel to the plane of the pitch circle of the gear wheel, the said parallel sided body being slideably located between a gripping part comprising a second pair of parallel flat sides which are rigidly attached to the gearbox housing, the planes of symmetry of the first pair of parallel sides and the second pair of parallel sides being substantially coincidental and there being a definite area of overlap between the first pair and the second pair.

The gripping means may in an alternative comprise a grip part comprising a body having a first pair of parallel sides which is rigidly attached to the non-rotating part of the tail bearing assembly and where the plane of symmetry of the said first pair of parallel sides is parallel to the nominal wormshaft axis and is inclined at an angle to the plane of the pitch circle of the gear wheel, the said parallel sided body being slideably located by the gripping device that comprises a second pair of parallel flat sides which are rigidly attached to the gearbox housing, the gripped member being located between these second sides, the planes of symmetry of the first pair of parallel sides and the second pair of parallel sides being substantially coincidental and there being a definite area of overlap between the first pair and the second pair.

The body could have sides that are not parallel. For example, the gripping means may comprise a first body having a first pair of non-parallel flat sides forming a protruding wedge which is substantially symmetrical and the first solid body being rigidly attached to the non-rotating part of the second bearing means and where the plane of symmetry of the said first pair of flat non-parallel sides is parallel to the nominal wormshaft axis and is substantially parallel to the plane of the pitch circle of the gear wheel, the said non-parallel sided first solid body being slideably located between a second pair of flat non-parallel flat sides forming a hollow wedge the second pair of flat non-parallel flat sides being rigidly attached to the gearbox housing, the planes of symmetry of the first pair of non-parallel flat sides and the second pair of non-parallel flat sides being substantially coincidental and there being a definite area of overlap between the first pair of flat non-parallel flat sides and the second pair of flat non-parallel flat sides.

In a still further modification, the said guiding means may comprises a first body having a first pair of non-parallel flat sides forming a protruding wedge which is substantially symmetrical and the first solid body being rigidly attached to the non-rotating part of the second bearing means and where the plane of symmetry of the said first pair of flat non-parallel sides is parallel to the nominal wormshaft axis and is inclined at an angle to the plane of the pitch circle of the gear wheel, the said non-parallel sided first solid body being slideably located between a second pair of flat non-parallel flat sides forming a hollow wedge the second pair of flat non-parallel flat sides being rigidly attached to the gearbox housing, the planes of symmetry of the first pair of non-parallel flat sides and the second pair of non-parallel flat sides being substantially coincidental and there being a definite area of overlap between the first pair of flat non-parallel flat sides and the second pair of flat non-parallel flat sides.

The solid body could, of course, be hollow, without altering its functionality. The term solid therefore should be interpreted broadly to include such a body.

In each of the last four arrangements with the solid body, the distances from the tail bearing assembly of the nearest and furthest edges of the area of overlap between the first pair and the second pair of parallel sides and the coefficient of friction between the contacting said parallel sides combine to prevent relative sliding motion in the first direction from occurring when the tail bearing assembly reacts the forces generated at the worm teeth during torque transmission by the gearbox.

The gripping means of the gearbox assembly may include a parallel sided spacer that is clamped between the second pair of parallel sides, the width of the said spacer being greater than the width across the first pair of parallel sides by an amount which determines the sliding clearance required between the first and second pair. A means for clamping the second friction faces onto the spacer may be provided.

To enable the tail bearing to permit the required pivoting of the wormshaft, the tail bearing may comprise an inner race, an outer race, and a set of needle or roller bearing elements that connect the inner race to the outer race, the bearing surface of the inner race being convex where it contacts the needle bearings so that the inner race can tilt relative to the outer race.

In a still further alternative, the main bearing may be arranged such that substantially none of the axial load on the wormshaft is reacted at the main bearing, the tail bearing being arranged so that it reacts the axial load applied to the wormshaft as a gearwheel torque is applied.

In such an arrangement the tail bearing means provides a substantially rigid restraint against movements of the wormshaft parallel to its own axis.

In an arrangement of this kind, the gripping means may comprise a grip part comprising a first member having first and second opposite exterior faces which are substantially perpendicular to the wormshaft axis, the first of which faces has at least one planar area which is parallel with at least one planar area on the second face, the first member being fixed to the non-rotating part of the tail bearing assembly with the said planar areas being substantially normal to the wormshaft axis, the said first and second opposite exterior faces of the said first member being adjacent to a gripping part comprising third and fourth faces which are respectively each one an exterior face of a second and a third member which are positioned on either side of the first member and are fixed relative to the gearbox housing and which each have at least one planar area which is parallel with and proximate to one of the said planer areas of the first member.

The first member may in use be urged by a component of force acting on the wormshaft in a direction parallel with its axis into contact with either the second member or the third member depending upon the direction of the said component of force, the said contact occurring between at least one pair of the planar areas each of a pair being on different members. This creates friction which is high enough to lock the tail bearing against unwanted movement in the first direction.

Motion of the first member in a direction perpendicular to the wormshaft axis may be constrained to be substantially linear by the engagement of a component which is fixed to the non-rotating part of the second bearing means in a slot or elongated hole the walls of which are fixed in a gearbox housing.

The gearbox assembly may further include a biasing means that applies a biasing force that biases the worm shaft into engagement with the wheel gear.

The biasing means may comprise a leaf spring that applies a force to the tail bearing assembly that biases the wormshaft in the first direction into engagement with the wheel gear.

The gripping means may be arranged so as to lock the tail bearing assembly with a grip force that is low enough to be overcome by the biasing means at zero gearwheel torque. Thus, the gripping means does not impede the function of the biasing means at zero gearwheel torques, yet acts to lock the wormshaft and wheel gear together at increasing torques.

The anti-rattle spring may comprise a leaf spring that applies a radial load to the tail bearing assembly. It may act directly onto the outer bearing race of the tail bearing assembly. The anti-rattle spring may apply a radial force that is less than the kick out force of the gearbox assembly but sufficient to bias the wormshaft teeth into engagement with the gearwheel teeth and overcome any friction force from the gripping means at zero gearwheel torque.

This low anti-rattle spring force provides significant benefits in terms of steering feel by helping keep the friction in the gearbox low for zero and very low gearwheel torques.

Other advantages of this invention will become apparent to those skilled in the art from the following detailed description of the preferred embodiments, when read in light of the accompanying drawings.

DETAILED DESCRIPTION OF THE INVENTION

Figure 3:
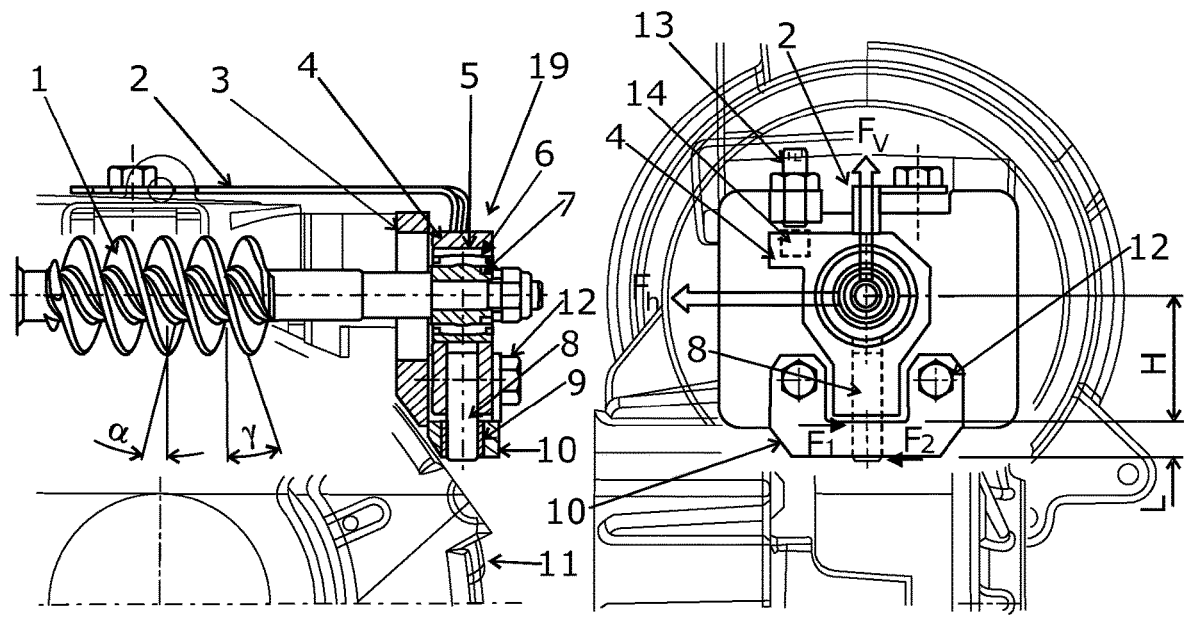
FIG. 3 is a view in cross section and end on of a first embodiment of a gearbox assembly in accordance with the present invention.

FIG. 3 shows a first embodiment of a gearbox assembly in accordance with an aspect of the Invention that can be incorporated into an electric power assisted steering apparatus. In use the gearbox assembly provides a geared reduction in the output of an electric motor of the steering apparatus, allowing torque generated by the motor to be transferred to the steering column or rack (or other part of the steering system), the torque assisting the driver to turn the wheel or providing the principle source of steering torque.

The gearbox assembly comprises a gearbox housing 11 which houses a worm shaft 1 connected to the rotor of an electric motor (not shown). The worm shaft 1 comprises an elongate shaft that carries a worm gear having a pair of interleaved helical teeth. The shaft 1 is supported by a main bearing assembly 15 (not shown in FIG. 3 but corresponding to the bearing assembly 104 shown in FIG. 1) at the side of the worm 1 that is closest to the motor and by a tail bearing assembly 19 at an end of the shaft 1 is furthest from the motor. Both bearing assemblies comprise an annular inner race that is threaded onto the shaft 1 and an annular outer race supported by the housing, with a set of bearing elements connecting the inner race to the outer race. The tail bearing as shown uses needle bearing elements 6 located between an outer race 5 and an inner race 6. As will be described both the bearing assemblies are able to move, in use, by a small amount relative to the housing 2 as torque is applied to the gearbox assembly.

Figure 1:
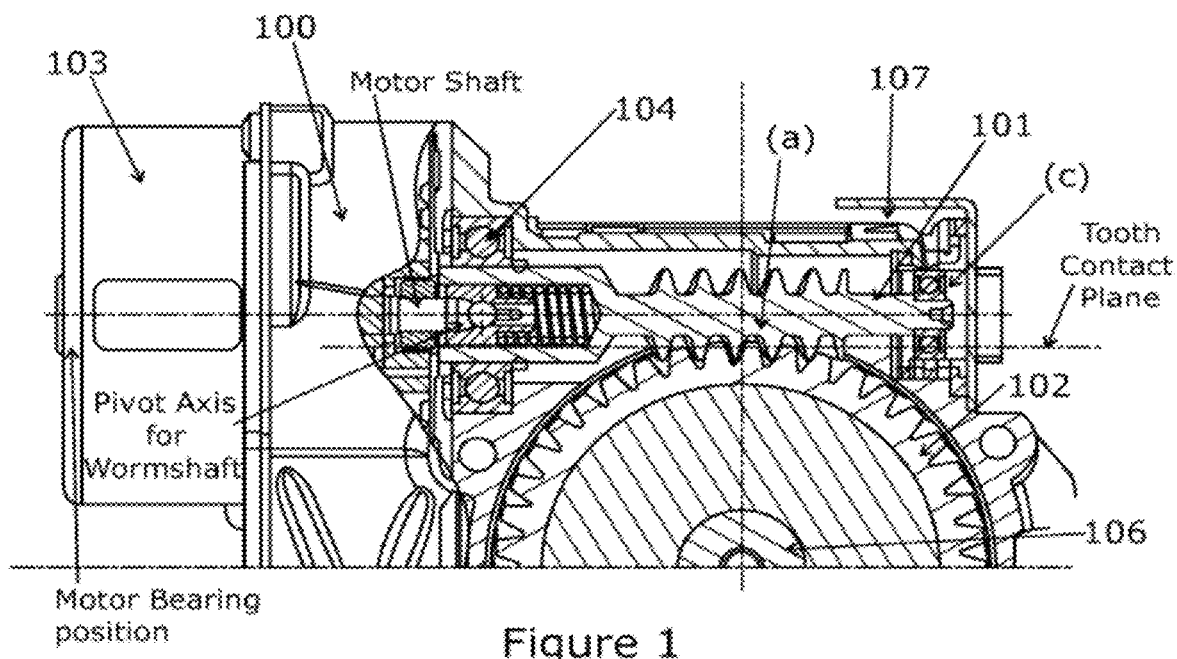
FIG. 1 is cross section view of a prior art gearbox assembly for an electric power assisted steering system.
Figure 2:
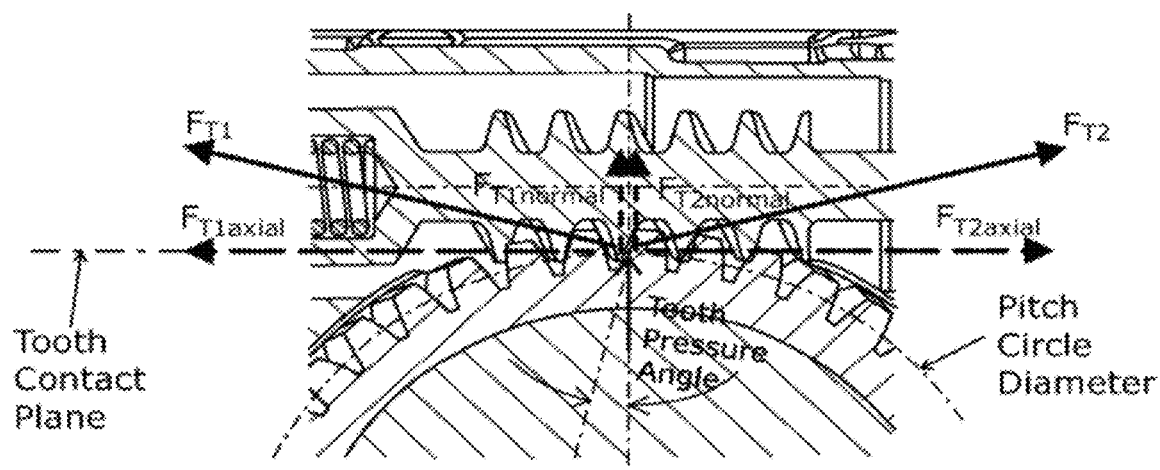
FIG. 2 is an enlarged view of part of FIG. 1 showing the direction of the forces that arise due to a torque carried by the gearwheel being reacted by the wormshaft.

The worm 1 is connected to a gear wheel of the kind shown in FIGS. 1 and 2 that is also housed in the housing. The wheel is supported on an output shaft, the two ends of which are accessible from outside of the gearbox. One end of the output shaft is connected to the steering shaft and onwards to the steering wheel (not shown), and the other end of the output shaft is connected to the steering rack and onwards to the road wheels. The output shaft therefore provides a mechanical path directly from the steering wheel to road wheels in this example and the gear wheel transfers torque from the motor to the output shaft to assist the driver.

The gear wheel and worm shaft 1 each have complimentary teeth that are meshed and may be in a single contact or double contact condition. In the former, each worm tooth that is engaged with the worm wheel at a given instant in time will contact at most only a single gear wheel tooth, and in the later condition at least one worm tooth will be in contact with the flanks of two gear wheel teeth at a given instant in time. In the embodiments of the present invention described here, a double contact condition is achieved for at least one tooth of the wormshaft to reduce rattle.

The main bearing assembly 15 and tail bearing assembly 19 allow some controlled axial movement of the worm shaft 1 and pivoting of the worm shaft. To avoid rattle at the bearings both bearing assemblies should have minimal free play between the inner and outer races for both radial and axial movement. An anti-rattle spring 2 applies a force onto the tail bearing outer race 5 that has a component radially towards the axis of the wheel gear, pressing the wormshaft onto the wheel gear. The pivoting of the wormshaft allows the full engagement of the wormshaft and wheel gear teeth at all times to be achievable at zero torque regardless of temperature or tolerances or wear because the anti-rattle spring presses teeth of the wormshaft into engagement with the wheel gear teeth.

Upward movement of the tail bearing is limited by a base plate 3 that is fixed to the gearbox housing and an adjustable articulation limiting screw 13 that contacts a soft end stop 14 that is carried by a guide fixed to the outer bearing race 5.

The anti-rattle spring 2 in the embodiments of the invention is considerably weaker than that used in the prior art such as FIG. 1. This is because it is only provided to bias the wormshaft into engagement with the wheel gear at zero torques, and is not intended to overcome the forces that are applied to the wormshaft from the wheel gear during all driving conditions. The spring therefore is too weak to prevent the wormshaft kicking out of engagement from the wheel gear. As will now be described, this function is instead provided by a gripping means that applies a low or zero grip at zero torques, allowing the anti-rattle spring to press the wormshaft onto the wheel gear, but locking the tailbearing when a torque is applied by the wheel gear to the wormgear through friction within the gripping means. In effect the gripping means uses a component of the reaction forces acting at the wormshaft tail bearing to lock the wormshaft in the dual-flank contact position with the gear wheel. That is to say, to lock it in the closest possible position to the gearwheel. It remains in that position even when the nominal kick-out torque, as calculated from the anti-rattle spring force, is exceeded. This is because the locking effect increases in proportion to the tooth separation force. Due to this, it is possible to maintain dual-flank contact for all levels of gear wheel torque, up to the system's maximum, while using a much reduced anti-rattle spring force. The result is a reduced amount of quiescent friction.

The first embodiment is illustrated in FIG. 3 that includes both a cross-section through the wormshaft axis in the region of its tail bearing and an end-on view along the wormshaft axis from outside of the gearbox housing. In this embodiment, the tail bearing 15 is of the needle roller type and has a cylindrical outer race 5 and a set of parallel rollers 6 held equi-spaced by a cage. The inner race 7 has a spherical portion at its centre which allows for some angular misalignment between the spherical inner race and the outer race. The outer race 5 is held in a bearing holder 4 while the spherical inner race is fixed to the wormshaft 1.

The movement of the outer race is controlled by a gripping means. This comprises a gripped part in the form of a pin 8 that is fixed to the bearing holder 4 and extends downwards below its base. The greater part of the projecting portion of the pin is slideably engaged with a gripping part, in this example comprising a bore in a bush 9 which is fixed in a bearing support member 10. The bearing support member 10 is fixed to a base plate 3 by Screws 12. The base plate 3 may either be a separate component which is mechanically fixed to the gearbox housing 11, as shown, or it may be an integral part of the housing. For example, it could be part of the same casting. The base plate cannot move relative to the gearbox housing.

The diametrical clearance between the pin 8 and the bush 9 is very small. This is to prevent rattle noise from occurring between these two parts when the bearing holder 4 is subjected to reversing horizontal loads. For the same reason, the diametrical clearance of the needle bearing relative to its races is also very small.

When a torque acts on the gearwheel causing a reaction at the wormshaft, the wormshaft imposes on the needle bearing 5, 6, 7 a horizontal radial force Fh which is a function of the tooth helix angle $\Upsilon$ (gamma) and a vertical radial force Fv. Fv is a function of the tooth pressure angle $\alpha$ (alpha). The helix angle $\Upsilon$ may be approximately 18 degrees and the tooth pressure angle $\alpha$ may be approximately 14 degrees. The ratio of forces Fh and Fv is approximately equal to the ratio of the tangents of these respective angles. Typically, Fh may be approximately 1.3 times greater than Fv. Note that the direction of Fh reverses when the torque is reversed but that of Fv does not.

In the first embodiment of the Invention, as illustrated in FIG. 3, force Fh will cause reaction forces F1 and F2 between the Pin 8 and the top and bottom extremities of the Bush 9. These forces F1 and F2 will cause a resistance to vertical movement of the Pin in the Bush equal to $(F1+F2) \times \mu$ where $\mu$ is the coefficient of sliding friction between the Pin and the Bush. If $(F1+F2) \times \mu$ is greater than Fv, then the wormshaft will be prevented from moving away from the gear wheel. That is to say that the wormshaft will remain in dual-flank contact with the gearwheel for all levels of torque.

Note that, due to leverage effects, $F1=Fh \times (L+H)/L$ and $F2=Fh \times H/L$. Therefore $F1+F2 \; Fh \times (1+2H/L)$ As mentioned above, for the Pin to lock in the Bush, force F1, that is to say $Fh \times (1+2H) \times \mu$, must be greater than I which itself equals $Fh \times \tan \alpha / \tan \Upsilon$.

Therefore, $Fh \times (1+2H/L) \times \mu$ must be greater than $Fh \times \tan \alpha / \tan \Upsilon$.

Dividing by Fh shows that $(1+2H/L) \times \mu$ must be greater than $\tan \alpha / \tan \Upsilon$ Therefore, for the Pin to lock in the Bush, $\mu$ must be greater than $(\tan \alpha / \tan \Upsilon)/(1+2H/L)$.

The role of the Anti-Rattle Spring (ARS) 2 is to ensure that the wormshaft remains in dual-flank contact with the gearwheel whenever there is zero torque. The ARS force required to achieve this is much less than that required to guarantee the kick-out torque which would be usual for a conventional EPS gearbox. Therefore, the quiescent friction due to the ARS is reduced by comparison.

The bearing 5,6,7 is designed as a needle bearing having a spherical inner race, instead of a cylindrical one, to prevent unintended forces or moments acting on the Bearing Holder 4 which may result from small axial or angular misalignments of the wormshaft. Without this bearing choice, the Pin could tend to jam in the Bush due to the said misalignments, even when there is zero torque at the gear wheel. If these misalignments were present, a stronger ARS might be needed to ensure that the wormshaft always settles into dual-flank contact when there is zero gearwheel torque. Higher quiescent friction would result if a stronger ARS were fitted.

The articulation limit soft stop 14, in conjunction with the adjuster screw 13, provides a mechanical limit to the distance the wormshaft can move away from the gear wheel. If the gripping means behaves as intended, this feature is redundant. However, it is included to ensure that the worm and gear can never separate by more than a prescribed amount.

In an alternative embodiment to that shown in FIG. 3, the gripped part could be secured to the gearbox housing and the gripping part to the outer bearing race. For example, the Pin could be anchored relative to the gearbox housing and could slide in a bore in the bearing holder. The lengths of the Pin, the bore and their distances from the centre of the bearing 5, 6, 7 would need to be reconfigured to replicate the desired locking effect.

Figure 3A:
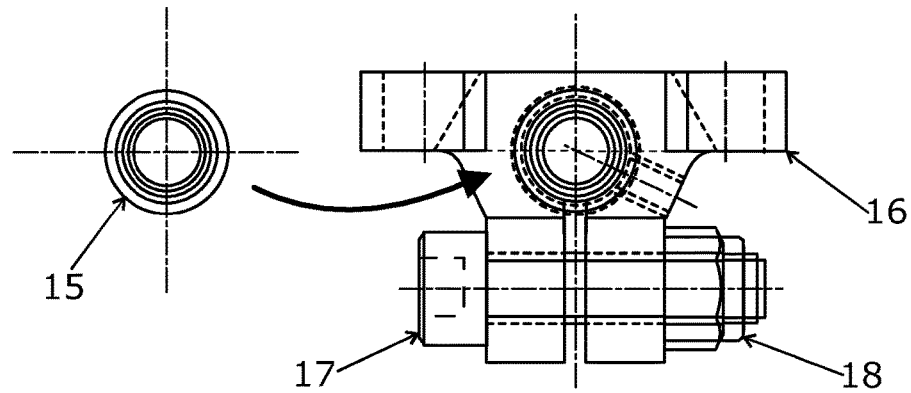
FIG. 3a shows a method of mounting a bush in an alternative design of bearing support.
Figure 3A:
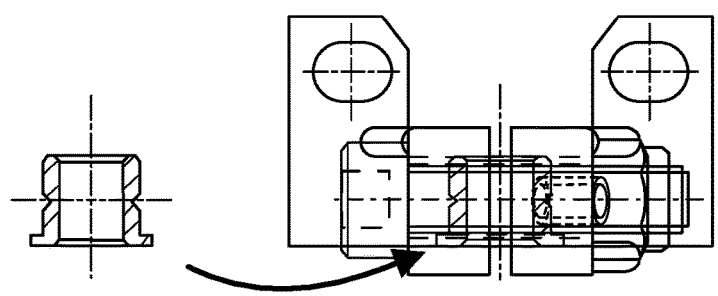

FIG. 3A shows a method of mounting a bush in an alternative design of bearing support 16 which enables it to be squeezed by tightening a screw 17 and/or a nut 18 in order to reduce the diameter of the bore of the bush fractionally. By this means the clearance between the bush and the pin can be finely adjusted after assembly.

Figure 4A:
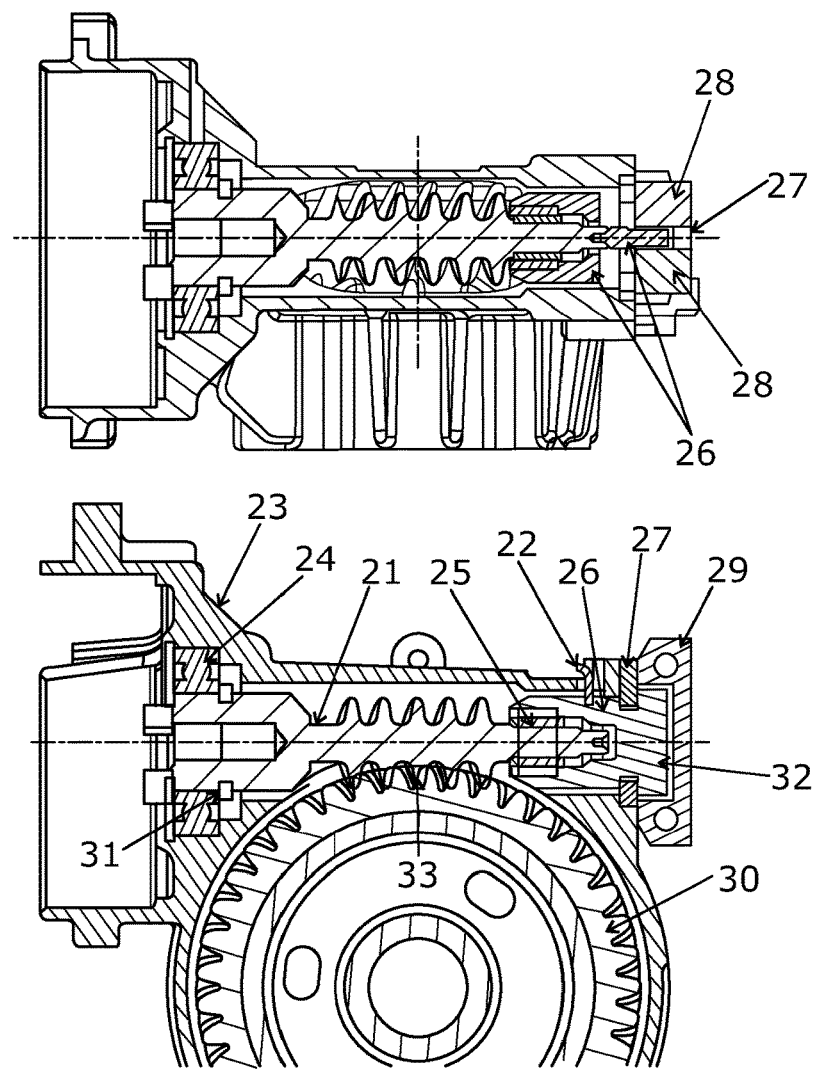
FIG. 4(a) is a view through the nominal wormshaft axis both in cross section and in plan of a second embodiment of a gearbox assembly in accordance with the present invention.

A second embodiment of the Invention is illustrated in FIGS. 4(a) to FIG. 6. FIG. 4(a) illustrates two orthogonal cross-sections through the nominal wormshaft axis. In this embodiment, the tail bearing 25 may be of the needle roller type, as shown, or a ball bearing whose inner race is a slide fit on the wormshaft 21. In either case, there needs to be a few microns of internal radial clearance between the rolling elements and the raceways to allow the tail bearing's inner and outer races to tilt relative to each other by some fraction of an angular degree.

The outer race of the bearing 25 is fixed in a tail bearing holder 26 which is basically cylindrical in shape in the region of the bearing but has an extension portion 32 with a narrow rectangular cross-section on its end distal from the wormshaft. The larger flat faces of the extension portion are parallel with the pitch circle plane of the gear wheel 30. This extension portion defines the gripped part of a gripping means in this embodiment. The extension portion is positioned in a gap between parallel faces of two friction blocks 28 which are fixed to the gearbox housing 23. The width of the said gap is determined by a spacer 29 which is clamped between the two friction blocks and is designed to be only a few microns wider than the extension portion 32 in order to avoid rattle problems when there are torque reversals in the gearbox. The two friction blocks form the gripping part of the gripping means in this second embodiment.

The main bearing 24, which may be of the deep groove ball type, has sufficient internal radial clearance between its rolling elements and its raceways to allow the bearing's inner and outer races to tilt relative to each other through some fraction of an angular degree thereby allowing the wormshaft 21 to pivot around a point which is approximately at the centre of the main bearing 24. Alternatively, the main bearing 24 may be flexibly mounted to the gearbox housing 23 such that the wormshaft has some freedom to tilt around a point which is in the locality of the main bearing 24 while having negligible freedom to move linearly along its own axis.

Figure 5:
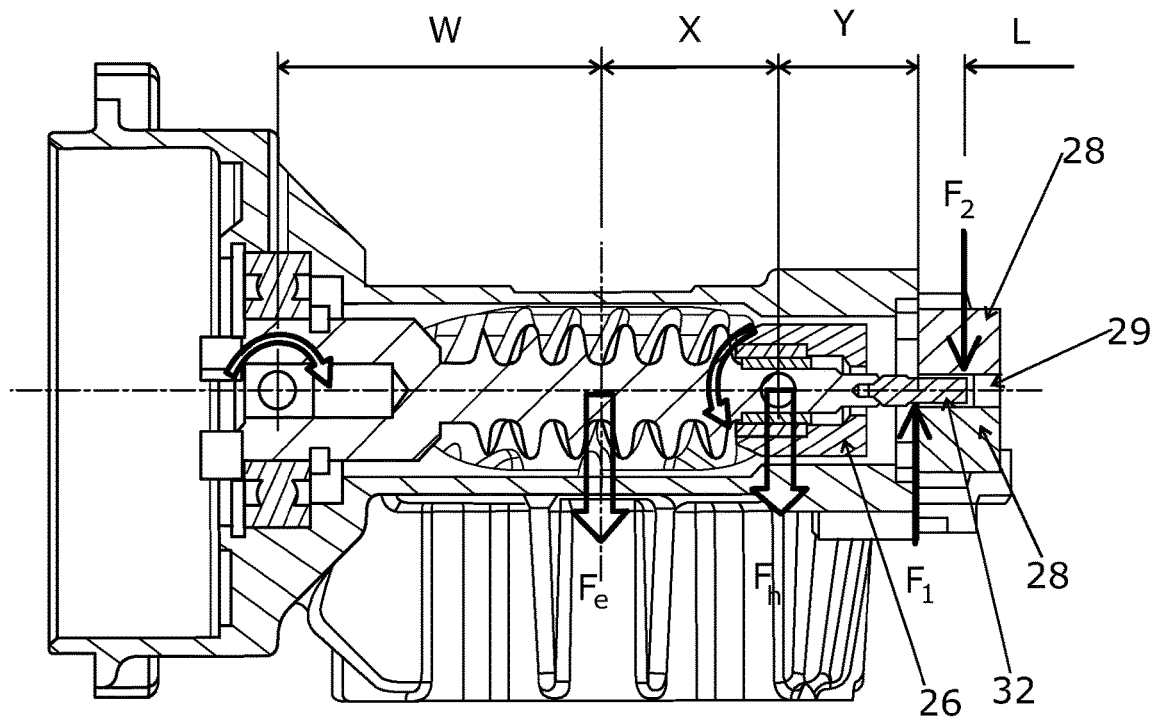
FIG. 5 is a plan view of the second embodiment of a gearbox assembly in accordance with the present invention showing some of the reaction forces produced by the gripping means when a torque is carried by the gearwheel.

FIG. 5 shows a cross-section of the wormshaft in a plane which is parallel to the gear wheel axis. When the gearbox is transmitting a given torque, there will be a proportional force Fe which is parallel to the gear wheel axis and which acts on the wormshaft at the meshing point 33 and whose magnitude is a function of the helix angle of the teeth. The force Fe will urge the wormshaft to pivot around the main bearing 24 and, in attempting to tilt, the wormshaft will impose a force Fh on the tail bearing 25. This will cause proportional reaction forces F1 and F2 at the extremities of the overlap between the extension portion of the tail bearing holder 26 and the parallel faces of the two friction blocks 28. The forces F1 and F2 will cause a resistance to sliding motion of the tail bearing Holder 26 relative to the friction blocks 28 which is equal to (F1+F2)×μ where μ is the sliding coefficient of friction between the tail bearing Holder 26 and the friction blocks 28.

Figure 6:
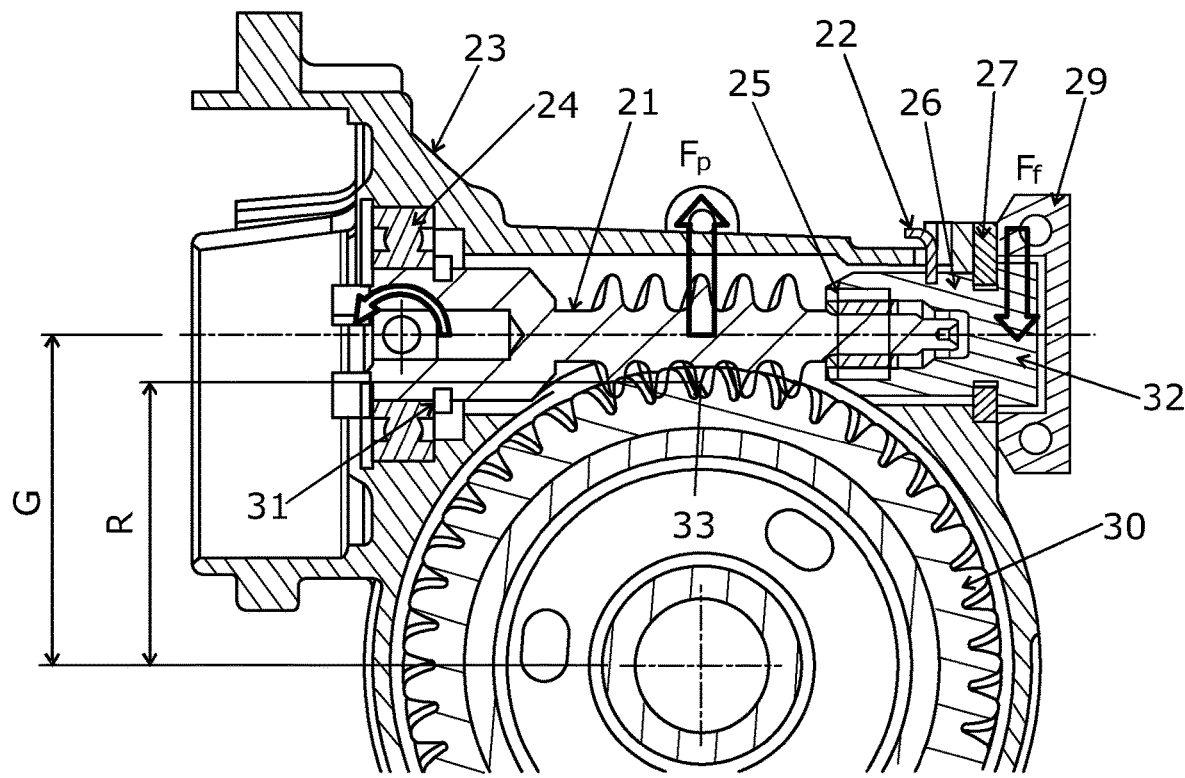
FIG. 6 is a cross sectional view of the gearbox assembly of the second embodiment showing the gripping forces.

FIG. 6 shows a cross-section of the wormshaft in a plane which is perpendicular to the gear wheel axis. The force Fp acting vertically on the wormshaft at the meshing point 33 is a function of the tooth pressure angle. It will urge the wormshaft to pivot around the main bearing 24. In attempting to tilt away from the gear wheel, the wormshaft will require a vertical force Ff at the Tail Bearing Holder extension to restrain it. If (F1+F2)×μ is greater than Ff, then the wormshaft will be prevented from moving away from the gear wheel. That is to say that the wormshaft will remain in dual-flank contact with the gearwheel for all levels of torque.

The role of the Anti-Rattle Spring 22 is to ensure that the wormshaft remains in dual-flank contact with the gearwheel whenever there is zero torque. The ARS force required to achieve this is much less than that required to guarantee the kick-out torque which would be usual for a conventional BPS gearbox. Therefore, the quiescent friction due to the ARS is reduced by comparison.

Referring to FIG. 5 and FIG. 6, it can be shown by calculation that, for the Tail Bearing Holder 26 to be locked in between the friction. Blocks 28, for any level of torque acting on the gear wheel, μ must be greater than $(\tan \alpha/\sin \Upsilon)+(G-R)/(W \cdot \tan \Upsilon)[2(Y+L)\cdot(W+X+Y)/(L\cdot(W+X))]-1$ Where R=the Pitch Circle Radius of the Gear.

The Tail Bearing 25 may be of the ball bearing type or the needle roller type (as illustrated). The bearing holder guide 27, which axially locates the bearing holder 26, is only required if the needle roller type is used. Its role is to restrain the bearing holder 26 from moving in the direction of the wormshaft axis.

Figure 7:
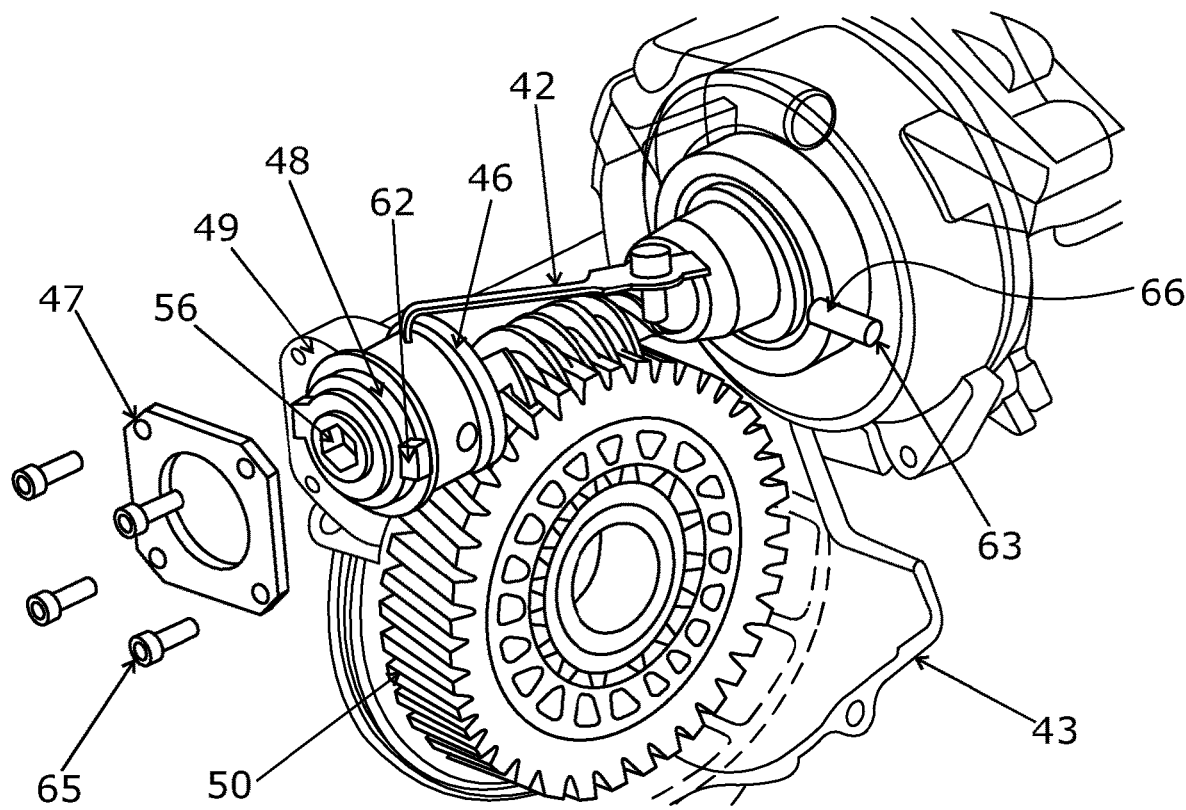
FIG. 7 is a perspective view of a third embodiment of a gearbox assembly in accordance with the present invention.
Figure 8:
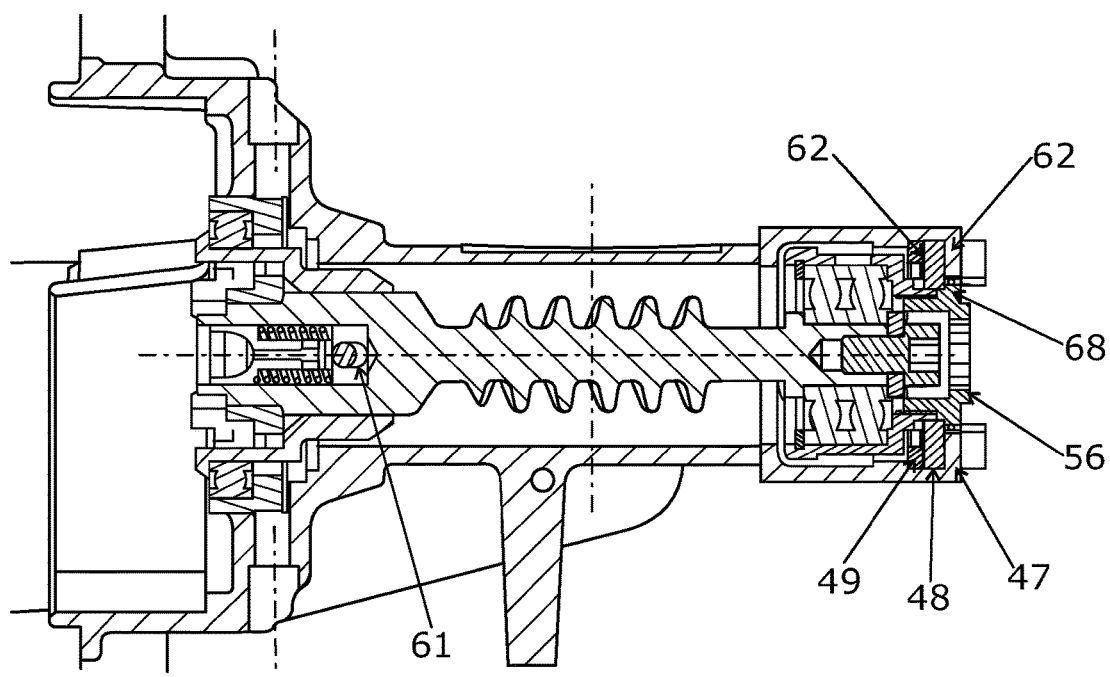
FIG. 8 is a view in plan and in cross section of the gearbox assembly of FIG. 7 showing the grip forces generated by the gripping means when the gearwheel carries a torque.
Figure 8:
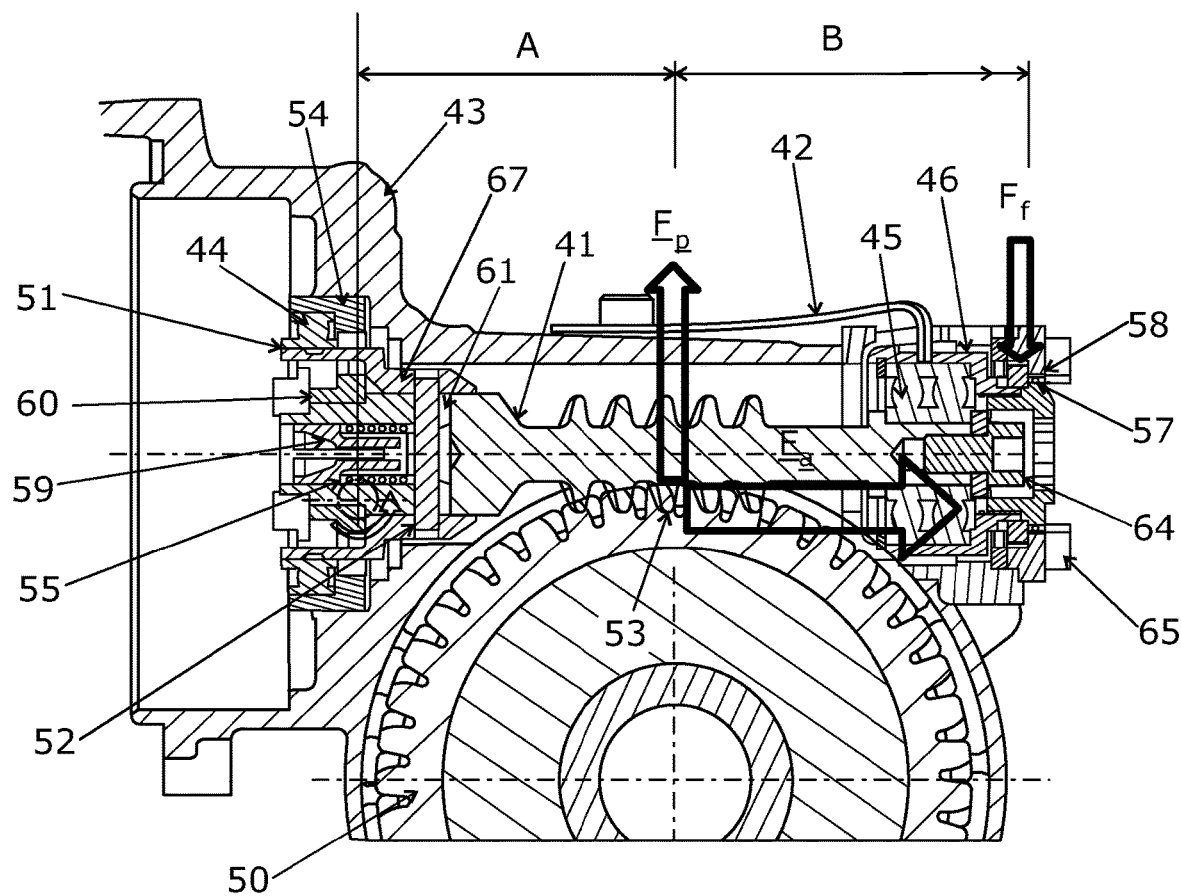

A third embodiment of the Invention is illustrated in FIGS. 7 and 8. FIG. 8 includes two orthogonal cross-sections through the nominal wormshaft axis. In this embodiment, the axial forces Fa acting on the worm during torque transmission are reacted at the tail bearing 45. The wormshaft pivots into and out of mesh about an axis defined by gimbal pins 63 at the main bearing end. The gimbal pins may be sited level with the tooth meshing point 53 since this minimises differences in gearbox friction between clockwise and counter-clockwise operation. In this embodiment, the axial wormshaft force acting on the tail bearing 45 is used to lock the wormshaft in the dual-flank meshing position whenever torque is applied the gearwheel.

The main bearing 44 is fixed in a gimbal 54 which pivots on the two gimbal pins 63 which are themselves fixed in the gearbox housing 50. The gimbal has two coaxial open semi-circular grooves 66 which locate against the gimbal pins. The grooves have the substantially the same radius as the pins. The pins are held in permanent contact with the bottoms of these grooves by a spring 55, one end of which acts against the end of the motor shaft (not shown) via a bush 59. The other end of spring 55 acts on the gimbal 54 via the cross pin 52 which is fixed to the gimbal at its ends. The spring ensures that the gimbal pivot is biased in one direction and therefore remains lash-free. The wormshaft is a free sliding fit in the gimbal bore 67 in its axial direction but is coupled to it rotationally by the engagement of the cross-pin 52 in the pin slot 61 in the wormshaft 41, the pin slot being in the form of an elongated hole. The cross-pin is able to slide freely along the length of the pin slot 61 in the axial direction of the wormshaft but, circumferentially relative to the wormshaft, is a precision fit in the slot. The gimbal 54 and the wormshaft 41 therefore rotate to together almost without lash.

A coupling flange 60 is pressed onto the wormshaft at its main bearing end and engages with the motor via a flexible spider coupling (not shown). The mechanical arrangement ensures that there are no significant forces acting on the wormshaft other than those which are due to its engagement with the gear wheel. It also results in the gimbal being isolated from the axial forces acting on the wormshaft, these axial forces being reacted be the tail bearing 45 instead.

The tail bearing 45 is fixed to the wormshaft 41 by a screw 64 and may be of the deep-groove ball type and may have a double row configuration as shown to ensure adequate axial loading capacity while still being relatively small in diameter. The outer race of the tail bearing is held in a tail bearing holder 46. To the outer end of this is fixed the moving friction plate 48, it being secured to the holder by the threaded wormshaft guide 56. The moving friction plate 48 is substantially flat and circular and defines a gripped part of a gripping means. It has two diametrically opposite protrusions the two sides of each of which act as friction surfaces. Each protrusion may be coated with, or have mechanically attached to it on each side, a layer of high friction material 62. When the gearbox is transmitting torque, the protrusions on the friction plate 48 are urged by the axial force on the wormshaft Fa into contact with either the inner friction plate 49 or with the outer friction plate 47, depending on the torque direction and hence the direction of Fa. These plates form a gripping part of the gripping means. The sliding coefficient of friction η between the contacting surfaces of these plates results in a frictional force Ff which resists the tendency for the wormshaft to be urged away from the gear wheel by the tooth separation force Fp. Note that Fp is caused by the interaction of the axial force Fa and the tooth pressure angle α.

When there is a reversal of the torque direction, the moving friction plate 48 is urged to lose contact with one of the friction plates 47 and 49 and to make contact with the other. To avoid a rattle problem when this occurs, the gap between the friction plates 47 and 49 may only be slightly wider than the thickness of the protrusions on the moving friction plate 48 or, more specifically, the thickness measured across the friction faces 62. The said gap can be finely adjusted using the screws 65 which secure the outer friction plate 47 to the gearbox housing 43.

The wormshaft guide 56 has a round spigot 68 at its outer end which incorporates an O-ring groove 57. This spigot is free to slide by a small distance in a short articulation slot 58 machined in the central portion of the outer friction plate 47 in the form of an elongated circle. The spigot 68 is thereby controlled to move only in a direction parallel to the plane of the gearwheel pitch circle diameter. The O-ring prevents rattle noise between the articulation slot 58 and the wormshaft guide spigot 68.

The role of the Anti-Rattle Spring 42 is to ensure that the wormshaft remains in dual-flank contact with the gearwheel whenever there is zero torque. The Anti-Rattle Spring force required to achieve this is much less than that required to guarantee the kick-out torque which would be usual in a conventional BPS gearbox. Therefore, the quiescent friction due to the ARS is reduced by comparison. The Anti-Rattle Spring 42 may also be used to prevent rotation of the tail bearing holder 46 via engagement of its free end with a hole or with an exterior detent in the wall of the tail bearing holder 46.

Referring to FIG. 8, in simple terms $$Ff=Fp \times A/(A+B)$$

But, $Fp=Fa \times \tan \alpha$ where $\alpha$=the gear tooth flank pressure angle.

Therefore, $Ff=Fa \times \tan \alpha \times A/(A+B)$

The friction force between the contacting plates 48 and 47 or 49 will be sufficient to hold the wormshaft in position in full mesh with the gearwheel if $Fa \times \eta$ is greater than $Ff$.

That is to say, if $Fa \times \eta$ is greater than $Fa \times \tan \alpha \times A/(A+B)$.

That is to say, $\eta$ must be greater than $\tan \alpha \times A/(A+B)$.

The skilled person will understand that by gripping we mean that at least one part is pressed against another part and in doing so a friction force is created, due to the coefficient of friction of the two surfaces, that resists relative sliding between the two parts. The value of the frictional force resisting the shear increases as the force with which the two surfaces are pressed together increases, i.e. how tight one face is gripped by the other. The tightness of the grip varies as a function of the torque carried by the gearwheel.

Figure 9:
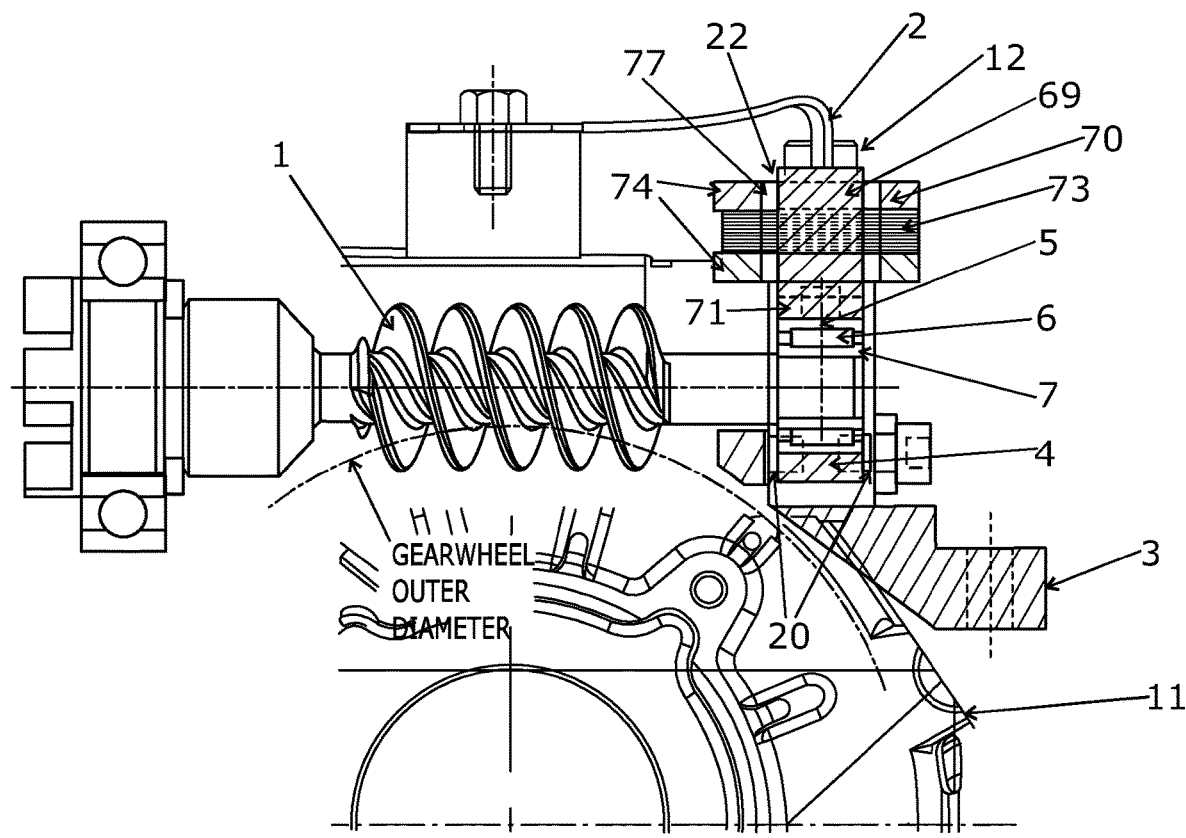
FIG. 9 is a cross-sectional view of the tail bearing assembly of a fourth embodiment of the present invention.
Figure 10:
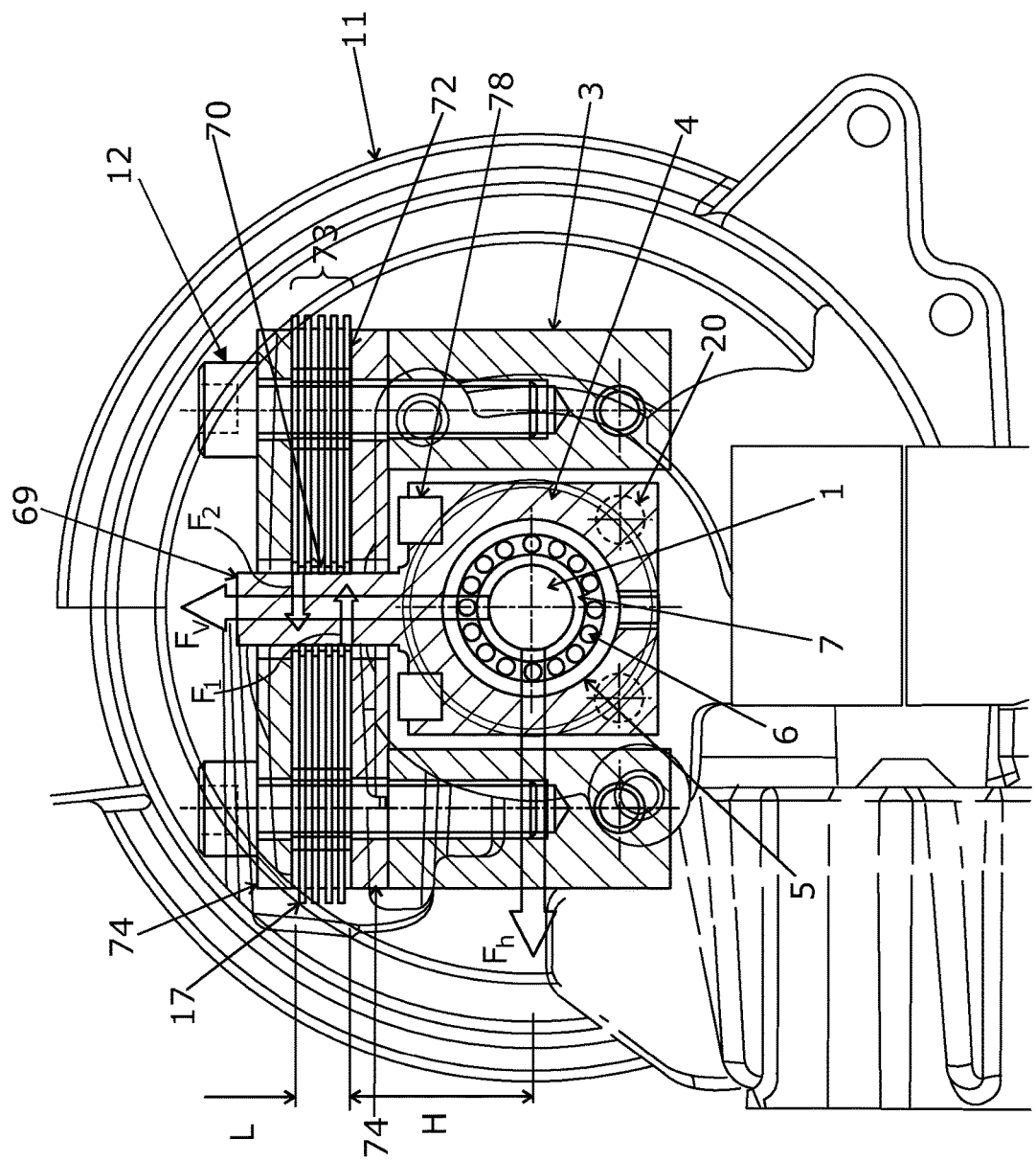
FIG. 10 is a cross-sectional view through the centre of the tail bearing viewed along the wormshaft axis of the embodiment of FIG. 9.

A fourth embodiment of the Invention is illustrated in FIGS. 9 and 10. FIG. 9 is a cross-section through the wormshaft axis in the region of its tail bearing and FIG. 10 is a cross-sectional view through the centre of the tail bearing viewed along the wormshaft axis, In this embodiment the position of the wormshaft tail bearing may be locked by equivalent forces to those used in the first embodiment. The tail bearing is of the needle roller type and has a cylindrical outer race 5 and a set of parallel rollers 6 held equi-spaced by a cage. The inner race 7 also has a cylindrical shape. The outer race 5 is held in a bearing holder 4 while the inner race is fixed to the wormshaft 1. FIGS. 9 and 10 show the main elements of this fourth embodiment rotated through 180 degrees around the wormshaft axis compared with the version of the first embodiment shown in FIG. 3. This rotation does not affect the principle of operation and it could equally be oriented the same as for the embodiment of FIG. 1.

A shaft 69 having a rectangular cross-section forms part of the bearing holder 4 and extends upwards from its main body. The greater part of the projecting portion of the shaft is slideably engaged within a rectangular castellated bore 70 which is formed by central apertures 71 in each of the laminations 72 which are assembled as a stack 73. The lamination stack 73 is sandwiched between rigid clamp plates 74 which are fixed relative to a base plate 3 by screws 12. The base plate 3 may either be a separate component which is mechanically fixed to the gearbox housing 11, as shown, or it may be an integral part of the gearbox housing. For example, it could be part of the same casting as the housing.

The horizontal clearances between the shaft 69 and the bore 70, as measured parallel to the gearwheel axis and in a plane normal to the wormshaft axis, are very small. This is to prevent rattle noise from occurring between these two parts when the bearing holder 4 is subjected to reversing horizontal loads. For the same reason, the diametrical clearance of the needle bearing relative to its races is also very small.

Figure 11:
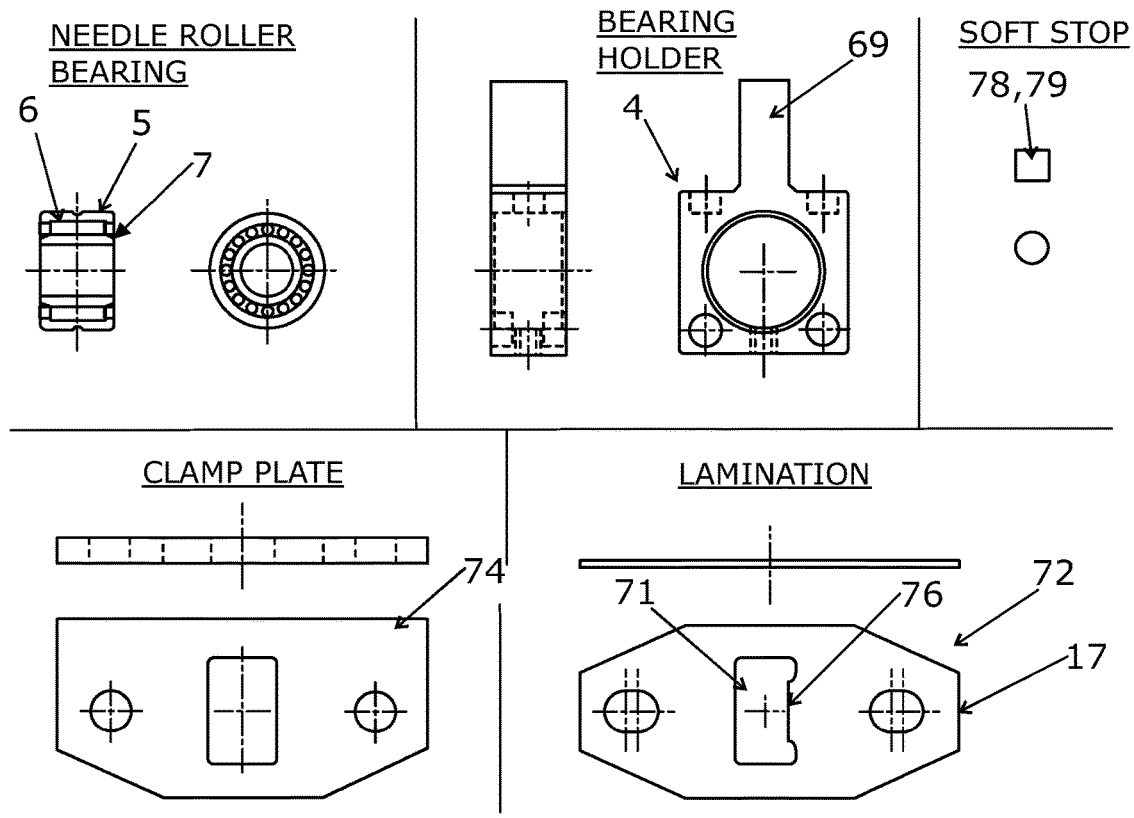
FIG. 11 is a detail view of some of the important components of the embodiment of FIG. 9.

Two views of each of important components of the embodiment are shown separately in FIG. 11. All the laminations 72 used in the stack 73 may be identical. They may be asymmetrical in shape and stacked in alternating first and second orientations so that one end 75 of each lamination protrudes slightly beyond the adjacent end of each neighbour. There is a prominent edge 76 along one side of the central aperture 71 of each lamination 72 and this is proximate with the shaft 69 in the assembly. The prominent edges 76 may be ground very straight and smooth after the lamination is stamped. In the assembly the prominent edge 76 of a lamination 72 in the first orientation is proximate with a first wide side of shaft 69 while the equivalent edge of each neighbouring lamination in the second orientation is proximate to the opposite second wide side of shaft 69. Before the screws 12 are tightened the said horizontal clearance between the shaft 69 and the bore 70 is adjustable to zero by simultaneously applying uniform light forces directed towards the shaft 69 to the protruding ends 75 of the all laminations. This action brings each prominent edge 76 into light contact with the first or second wide sides of shaft 69. The screws 12 are then tightened. Ideally, there are an odd number of laminations so that the same overall length of engagement L occurs between the shaft 8 and the sides of the rectangular bore 70 whether the bearing holder 4 is being urged to the left or to the right. Dimension H in FIG. 10 will vary by the thickness of one lamination depending on whether the bearing holder 4 is being urged to the left or to the right.

Referring to FIG. 10, when a torque acts on the gearwheel causing a reaction at the wormshaft, the wormshaft imposes on the needle bearing 5, 6, 7 a horizontal radial force Fh which is a function of the tooth helix angle $\Upsilon$ (gamma) and a vertical radial force Fv. Fv is a function of the tooth pressure angle $\alpha$ (alpha). The helix angle $\Upsilon$ may be approximately 18 degrees and the tooth pressure angle $\alpha$ may be approximately 14 degrees. The ratio of forces Fh and Fv is approximately equal to the ratio of the tangents of these respective angles. Typically, Fh may be approximately 1.3 times greater than Fv. Note that the direction of Fh reverses when the torque is reversed but that of Fv does not.

In the fourth embodiment of the invention, as illustrated in FIGS. 9 and 10, force Fh will cause reaction forces F1 and F2 between the shaft 69 and the bottom and top of the bore 70. These forces F1 and F2 will cause a resistance to vertical movement of the pin in the bore equal to $(F1+F2) \times \mu$ where $\mu$ is the coefficient of sliding friction between the shaft and the bore. If $(F1+F2) \times \mu$ is greater than Fv, then the wormshaft will be prevented from moving away from the gear wheel.

That is to say that the wormshaft will remain in dual-flank contact with the gearwheel for all levels of torque.

Note that, due to leverage effects, F1=Fh×(L+H)/L and F2=Fh×H/L.

Therefore F1+F2=Fh×(1+2H/L)

As mentioned above, for the shaft to lock in the bore, force F1, that is to say Fh×(1+2H/L)×µ, must be greater than Fv, which itself equals Fh×tan α/tan ϒ.

Therefore, Fh×(1+2H/L)×µ must be greater than Fh×tan α/tan ϒ.

Dividing by Fh shows that (1+2H/L)×µ must be greater than tan α/tan ϒ

Therefore, for the shaft to lock in the lore h, µ must be greater than (tan α/tan ϒ)/(1+2H/L).

The role of the Anti-Rattle Spring 2 is to ensure that the wormshaft remains in dual-flank contact with the gearwheel whenever there is zero torque. The ARS force required to achieve this is much less than that required to guarantee the kick-out torque which would be usual for a conventional EPS gearbox. Therefore, the quiescent friction due to the ARS is reduced by comparison.

Referring to FIG. 9, the bearing 5, 6 and 7 is designed as a needle bearing having a conventional cylindrical inner race, instead of the spherical inner race used in the first embodiment. This is because small angular misalignments of the wormshaft with respect to the lamination stack 73 can be accommodated by the pin 69 being able to rotate slightly in the plane of the gear wheel owing to the clearances 77 between the narrow faces 78 of the shaft 69 and the narrow faces of the bore 70.

The articulation soft stops 78 shown in FIG. 10 provide a mechanical limit to the distance that the wormshaft can move away from the gear wheel. If the Invention only ever behaves as intended, this feature is redundant. However, it is included to ensure that the worm and gear can never separate by more than a prescribed amount.

The horizontal soft stops 79 located in the bearing holder 4 maintain the shaft 69 in an approximately central position with respect to the bore 70 as viewed in FIG. 9.

In an alternative embodiment to that shown in FIG. 9 the shaft could be anchored relative to the gearbox housing and could slide in a bore formed by laminations bolted to the bearing holder. The lengths of the shaft, the bore and their distances from the centre of the bearing 5, 6, 7 would need to be reconfigured to replicate the desired locking effect.

Figure 4B:
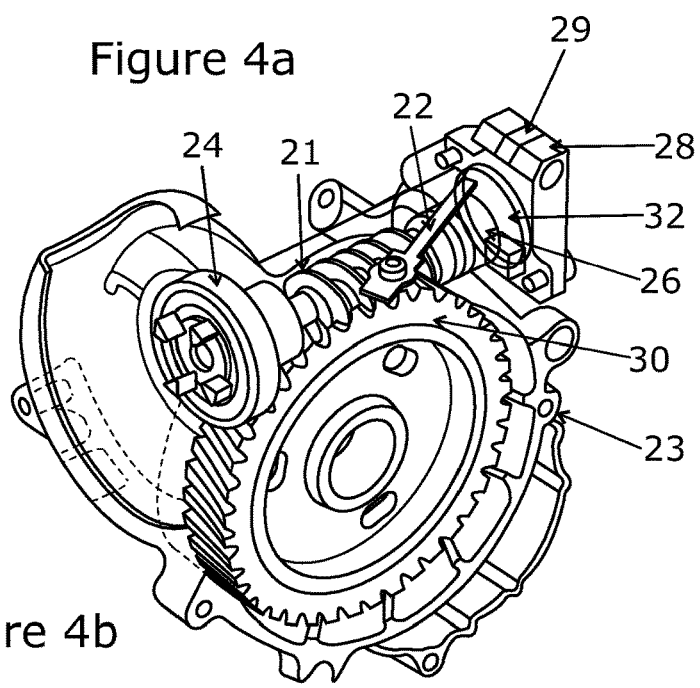
FIG. 4(b) is a perspective view of the gearbox assembly of FIG. 4(a)
Figure 12:
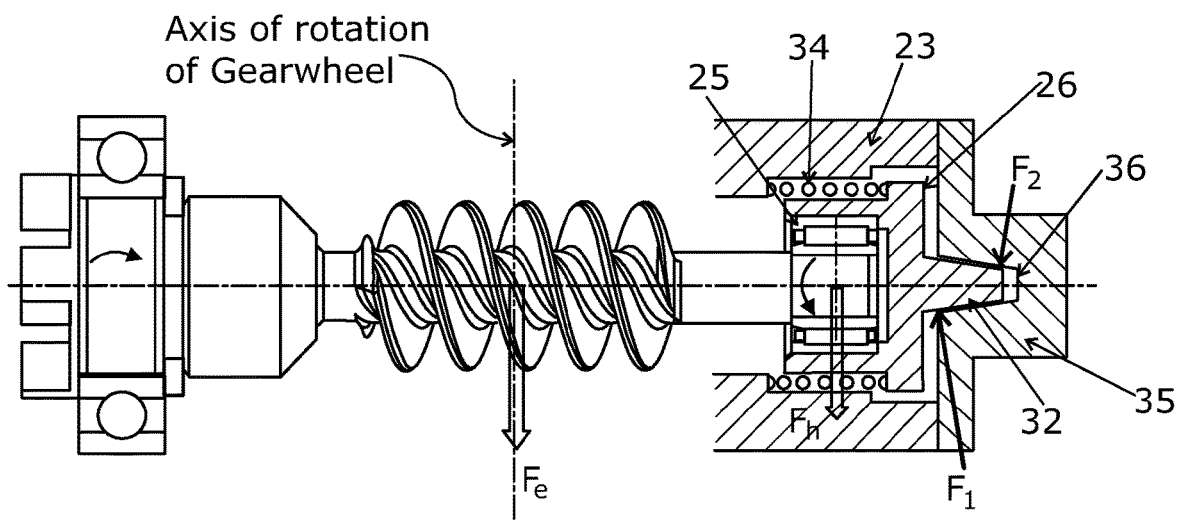
FIG. 12 is a cross-sectional view through the wormshaft axis in the region of its tail bearing, in accordance with a fifth embodiment of the invention.

In a fifth embodiment of the invention, which is based on the second embodiment, the tail bearing holder 26 has been modified as illustrated in FIG. 12 (compare with FIG. 4 where the corresponding description of like parts from FIG. 4 applies to the arrangement of FIG. 12). FIG. 12 is a cross-section through the wormshaft axis in the region of its tail bearing, as viewed in the direction towards the gearwheel. In this fifth embodiment, the requirement for achieving very accurate matching of the width of the tail holder extension 32 relative to the width of the gap between the inside faces of the friction blocks has been eased by equally tapering both to create a wedge type of engagement. In FIG. 12, the tail bearing holder 26 is fixed to the outer race of the needle roller bearing 25 and can freely slide by a small amount along the wormshaft axis since the rollers are not constrained axially by the inner race. A compression spring 34 is seated on the gearbox housing 23 at one end and its other end urges the tail bearing holder 26 towards the friction block 35 which has a tapered gap 36. The friction block 35 is fixed to the gearbox housing 23 and may be made as a single component, as shown in FIG. 12. The force of the spring and the included angle of the taper may be chosen in combination so as to cause only low frictional resistance to sliding of the tail bearing holder in the friction block (i.e. sliding in a direction normal to the view of FIG. 12) while simultaneously ensuring that those components, of the now angled forces $F_1$ and $F_2$, which are parallel to the wormshaft axis do not urge the tail bearing holder away from the friction block (i.e. in a direction to the left in the view of FIG. 12).

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A gearbox assembly for an electric power assisted steering apparatus comprising:
   a gearbox housing which houses a worm shaft and a gear wheel,
   the worm shaft incorporating one or more external helical worm teeth and being supported relative, to the housing by a main bearing assembly at a first end and by a tail bearing assembly at a second end opposing the first end, and the gear wheel being supported by an output shaft having at least one end that provides a take-off from the gearbox assembly,
   in which at least the tail bearing assembly is free to move relative to the housing through a limited range of motion that enables the worm shaft to move radially away from an axis of the gear wheel, and
   one of the main bearing assembly and the tail bearing assembly acting as a pivot centre for tilting movements of the worm shaft and the tail bearing assembly further allowing linear movements of the worm shaft in a first direction substantially normal to a worm shaft axis so as to displace the worm teeth in and out of meshing engagement with the gear wheel, the teeth of the worm shaft having sloping flanks which cause the worm shaft to be urged in that first direction away from the gear wheel when the gearbox is transmitting torque and the worm teeth of the worm shaft having a helix angle which causes the worm teeth to be urged in a second direction generally parallel to the gear wheel axis when the gearbox is transmitting torque,
   wherein the gearbox assembly further comprises a gripping means having a gripping part fixed to one of the tail bearing assembly and the gearbox housing and a gripped part that is fixed to the other of the tail bearing assembly and the gearbox housing, the gripping part applying a gripping force onto the gripped part which increases as the gear wheel torque increases such that for non-zero gear wheel torques the gripping means generates a friction force that locks the tail bearing assembly to prevent the linear movements of the worm shaft in the first direction that would otherwise occur.

2. The gearbox assembly according to claim 1 in which the main bearing assembly provides a substantially rigid restraint against movements of the worm shaft parallel to the worm shaft axis.

3. The gearbox assembly according to claim 2 in which the gripped part is secured to the tail bearing assembly and the gripping part is fixed relative to the gearbox housing and grips the gripped element.

4. The gearbox assembly according to claim 3 in which the gripping part comprises a first member which is rigidly attached to a non-rotating part of the tail bearing assembly and axis of the first member extends from the the non-rotating part in a substantially radial direction away front the tail bearing assembly, the substantially radial direction being substantially parallel to a plane of a pitch circle of the gear wheel, the first member being slideably engaged with a gripping mechanism that comprises a second member which is distal from the worm shaft axis and is rigidly attached to the gearbox housing, the second member having a bore which receives the first member, the first member and the bore having a common axis that extends in a direction substantially normal to the worm shaft axis and there being a definite length of engagement between the first member and the bore.

5. The gearbox assembly according to claim 2 in which the gripping means comprises a gripped element that is secured to the gearbox housing and a gripping mechanism that is fixed relative to the tail bearing assembly and that grips the gripped element.

6. The gearbox assembly according to claim 5 in which the gripped element comprises a first member which is distal from the worm shaft axis and which is rigidly attached at one end to the gearbox housing and which extends in a substantially radial direction towards the centre of the tail bearing assembly and which is substantially parallel to a plane of a pitch circle of the gear wheel, the first member being slideably engaged with the gripping mechanism which comprises a second member which is rigidly attached to a non-rotating part of the tail bearing assembly the second member having a bore which extends in a substantially radial direction away from the tail bearing assembly and which is coaxial with the first member, the first member and the said bore having a common axis that extends in a direction substantially normal to the worm shaft axis and there being a definite length of engagement between the first member and the bore.

7. The gearbox assembly according to claim 2 in which the tail bearing assembly is a needle roller bearing having a cylindrical outer race and a set of parallel rollers held circumferentially spaced by a cage and haying an inner race which has a spherical portion at a centre thereof which avows for angular misalignment between the inner race and the outer race.

8. The gearbox assembly according to claim 2 in which the gripping means comprises a first member which is rigidly attached to a non-rotating part of the tail bearing assembly and an axis of the first member extends from the non-rotating part in a substantially radial direction away from the tail bearing assembly the substantially radial direction being at an angle to a plane of a pitch circle of the gear wheel, the first member being slideably engaged with a second member which is distal from the worm shaft axis and is rigidly attached to the gearbox housing the second member having a complimentary bore which is coaxial with the first member, the first member and the bore having a common axis that extends in a direction substantially normal to the worm shaft axis and there being a definite length of engagement between the first member and the bore.

9. The gearbox assembly according to claim 2 in which the guiding means comprises a first member which is elongate and has a rectangular cross-section the first member being rigidly attached at a first end thereof to a non-rotating part of the tail bearing assembly either directly or via a connecting element and an axis of the said first member extending from the non-rotating part in a substantially radial direction away from the tail bearing assembly the substantially radial direction being at an angle to a plane of a pitch circle of the gear wheel, the first member being slideably engaged at a second end thereof with a second member which is distal from the worm shaft axis and being rigidly attached to the gearbox housing the second member having a bore of rectangular cross section which is coaxial with the first member, the first member and the bore having a common axis that extends in a direction substantially normal to the worm shaft axis and there being a definite length of engagement between the first member and at least two opposite sides of the said bore.

10. The gearbox assembly according to claim 2 in which the gripping means comprises a first member which is distal from the worm shaft axis and which is rigidly attached at one end to the gearbox housing and which extends in a substantially radial direction towards a centre of tail bearing assembly and which is at an angle to a plane of a pitch circle of the gear wheel, the first member being slideably engaged with a second member which is rigidly attached to a non-rotating part of the tail bearing assembly the second member having a bore which extends in a substantially radial direction away from the tail bearing assembly and which is coaxial with the first member, the first member and the bore haying a common axis that extends in a direction substantially normal to the worm shaft axis and there being a definite length of engagement between the first member and the bore.

11. The gearbox assembly according to claim 10 in which the first member comprises an elongate cylinder and the bore of the second member has a cylindrical shape that has a diameter substantially equal to a diameter of the first member.

12. The gearbox assembly according to claim 10 in which the guiding means comprises a first member which is elongate and has a rectangular cross-section and which is distal from the worm shaft axis and which is rigidly attached at a first end thereof to the gearbox housing either directly or via a connecting element and the axis of the first member extending in a substantially radial direction towards the centre of the second bearing means and being at an angle to the plane of the pitch circle of the gear wheel, the first member being slideably engaged with a second member which is rigidly attached to a non-rotating part of the tail bearing assembly the second member having a bore of rectangular cross section which extends in a substantially radial direction away from the tail bearing assembly and which is coaxial with the first member, the first member and the said bore having a common axis that extends in a direction substantially normal to the worm shaft axis and there being a definite length of engagement between the first cylindrical member and the cylindrical bore.

13. The gearbox assembly according to claim 10 in which the distance from the worm shaft axis of the cylindrical bore in the second member, the length of engagement of the first member in the bore and a coefficient of sliding friction between the first member and the bore combine to prevent sliding motion from occurring, one relative to the other, when the tail bearing assembly reacts forces generated at the worm teeth during torque transmission by the gearbox assembly.

14. The gearbox assembly according to claim 2 in which the gripping means comprises a body haying a first pair of parallel sides which is rigidly attached to a non-rotating part of the tail bearing assembly and where a plane of symmetry of the first pair of parallel sides is parallel to the worm shaft axis and is substantially parallel to a plane of a pitch circle of the gear wheel, the body being slideably located between a second pair of parallel flat sides which are rigidly attached to the gearbox housing, the plane of symmetry of the first pair of parallel sides and a plane of symmetry of the second pair of parallel sides being substantially coincidental and there being a definite area of overlap between the first pair of parallel sides and the second pair of parallel flat sides.

15. The gearbox assembly as claim 2 in which the gripping means comprises a gripped member comprising a body haying a first pair of parallel sides which is rigidly attached to a non-rotating part of the tail bearing assembly and where a plane of symmetry of the first pair of parallel sides is parallel to the worm shaft axis and is inclined at an angle to a plane of a pitch circle of the gear wheel, the body being slideably located by the gripping device comprising a second pair of parallel flat sides which are rigidly attached to the gearbox housing, the gripped member being located between the second pair of parallel flat sides, the plane of symmetry of the first pair of parallel sides and a plane of symmetry of the second pair of parallel flat sides being substantially coincidental and there being a definite area of overlap between the first pair of parallel sides and the second pair of parallel flat sides.

16. The gearbox assembly according to claim 2 an which the auiding means comprises a first body having a first pair of non-parallel fiat sides forming a protruding wedge which is substantially symmetrical and the first body being rigidly attached to a non-rotating part of the tail bearing assembly and where a plane of symmetry of the first pair of non-parallel flat sides is parallel to the worm shaft axis and is inclined at an angle to a plane of a pitch circle, of the gear wheel, the first body being slideably located between a second pair of non-parallel flat sides forming a hollow wedge the second pair of non-parallel flat sides being rigidly attached to the gearbox housing, the plane of symmetry of the first pair of non-parallel flat sides and a plane of symmetry of the second pair of non-parallel flat sides being substantially coincident and there being a definite area of overlap between the first pair of non-parallel flat sides and the second pair of non-parallel flat sides.

17. The gearbox assembly according to claim 1 in which the gripping means comprises a first body having a first pair of non-parallel flat sides forming a protruding wedge which is substantially symmetrical and the first body being rigidly attached to a non-rotating part of the tail bearing assembly and where a plane of symmetry of the first pair of non-parallel flat sides is parallel to the worm shaft axis and is substantially parallel to a plane of a pitch circle of the gear wheel, the first body being slideably located between a second pair of non-parallel flat sides forming a hollow wedge, the second pair of non-parallel flat sides being rigidly attached to the gearbox housing, the plane of symmetry of the first pair of non-parallel flat sides and a plane of symmetry of the second pair of non-parallel flat sides being substantially coincident and there being a definite area of overlap between the first pair of non-parallel flat sides and the second pair of non-parallel flat sides.

18. The gearbox assembly according to claim 1 in which elastomeric inserts acting on a non-rotating part of the tail bearing assembly limit the movement of the worm shaft away from the gear wheel.

19. The gearbox assembly according to claim 1 in which elastomeric inserts acting on the non-rotating part of the tail bearing assembly limit the movement of the non-rotating part of the tail bearing assembly along the direction of the worm shaft axis.

20. The gearbox assembly according to claim 1 which further includes a biasing means that applies a biasing force that biases the worm shaft into engagement with the gear wheel.

\* \* \* \* \*